US008260057B2

(12) United States Patent
Hasegawa et al.

(10) Patent No.: US 8,260,057 B2
(45) Date of Patent: Sep. 4, 2012

(54) IMAGE PROCESSING APPARATUS THAT OBTAINS A RULED LINE FROM A MULTI-VALUE IMAGE

(75) Inventors: Fumihiro Hasegawa, Tokyo (JP); Keiichi Isono, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 1101 days.

(21) Appl. No.: 12/216,098

(22) Filed: Jun. 30, 2008

(65) Prior Publication Data
US 2009/0016613 A1  Jan. 15, 2009

(30) Foreign Application Priority Data

Jul. 12, 2007 (JP) ................................ 2007-183379
May 22, 2008 (JP) ................................ 2008-134100

(51) Int. Cl.
*G06K 9/48* (2006.01)
*G06K 9/34* (2006.01)
*G06K 9/40* (2006.01)
*H04N 1/40* (2006.01)
(52) U.S. Cl. ......... 382/199; 382/173; 382/260; 358/462
(58) Field of Classification Search .................. 382/199, 382/173, 260; 358/462
See application file for complete search history.

(56) References Cited

U.S. PATENT DOCUMENTS

| 5,548,415 | A | 8/1996 | Tanaka et al. | |
| 6,141,444 | A | 10/2000 | Hasegawa | |
| 2003/0198386 | A1* | 10/2003 | Luo | 382/199 |
| 2007/0154112 | A1* | 7/2007 | Tanaka | 382/284 |

FOREIGN PATENT DOCUMENTS

| CN | 1120705 | 4/1996 |
| JP | 05-136994 | 6/1993 |
| JP | 06-004704 | 1/1994 |
| JP | 07-037036 | 2/1995 |
| JP | 2000-125135 | 4/2000 |
| JP | 2002-133426 | 5/2002 |
| JP | 2005-348279 | 12/2005 |
| JP | 2006-217058 | 8/2006 |

OTHER PUBLICATIONS

Office Action for corresponding Chinese Application No. 2008010280428 dated Apr. 8, 2010 and English translation thereof.
English language abstract of JP 3215163 dated Jul. 27, 2001.
English language abstract of JP 3344774 dated Aug. 30, 2002.

* cited by examiner

*Primary Examiner* — Kathleen Y Dulaney
(74) *Attorney, Agent, or Firm* — Harness, Dickey & Pierce, P.L.C.

(57) ABSTRACT

In an image processing apparatus, a binary image generating unit generates a binary image from a multi-value image, a ruled line candidate extracting unit extracts ruled line candidate pixels constituting a ruled line from the binary image, an edge detecting unit determines, from the multi-value image, target pixels that are positioned near the ruled line candidate pixels and detects edge information indicative of whether each target pixel constitutes an edge, and a ruled line obtaining unit obtains a ruled line from the multi-value image based on the edge information detected by the edge detecting unit.

17 Claims, 8 Drawing Sheets

FIG. 5A

| -1 | 0 | 1 |
|---|---|---|
| -1 | 0 | 1 |
| -1 | 0 | 1 |

FIG. 5B

| -1 | -1 | -1 |
|---|---|---|
| 0 | 0 | 0 |
| 1 | 1 | 1 |

ORIGINAL IMAGE
(MULTI-VALUE IMAGE)

| 98 | 73 | 95 | 92 | 90 | 71 | 98 | 98 | 98 | 75 |
|---|---|---|---|---|---|---|---|---|---|
| 98 | 92 | 90 | 75 | 98 | 98 | 98 | 75 | 99 | 98 |
| 75 | 72 | 75 | 76 | 75 | 73 | 75 | 72 | 76 | 75 |
| 98 | 92 | 91 | 73 | 89 | 98 | 90 | 76 | 98 | 94 |
| 98 | 78 | 88 | 98 | 91 | 70 | 98 | 91 | 98 | 79 |
| 75 | 75 | 76 | 75 | 75 | 79 | 77 | 74 | 76 | 75 |
| 98 | 78 | 98 | 92 | 98 | 75 | 98 | 93 | 97 | 73 |
| 98 | 98 | 98 | 75 | 98 | 97 | 98 | 75 | 98 | 90 |
| 75 | 73 | 75 | 76 | 75 | 75 | 71 | 72 | 74 | 75 |
| 98 | 92 | 94 | 72 | 98 | 93 | 98 | 75 | 95 | 98 |

PARTLY ENLARGED IMAGE
(NUMBERS CORRESPOND TO BRIGHTNESS)

⇓ BINARIZATION WITH THRESHOLD OF 85 ⇓

EXAMPLE OF BINARIZATION
(PIXELS IN SOLID FRAME ARE EXTRACTED AS RULED LINE)

IMAGE PROCESSING APPARATUS THAT OBTAINS A RULED LINE FROM A MULTI-VALUE IMAGE

CROSS-REFERENCE TO RELATED APPLICATIONS

The present application claims priority to and incorporates by reference the entire contents of Japanese priority documents, 2007-183379 filed in Japan on Jul. 12, 2007 and 2008-134100 filed in Japan on May 22, 2008.

BACKGROUND OF THE INVENTION

1. Field of the Invention

The present invention relates to an image processing apparatus, an image processing method, and a computer program product.

2. Description of the Related Art

Various methods for extracting a ruled line from an image have been proposed; for example, Japanese Patent No. 3215163 discloses a method of determining a ruled line based on an aspect ratio of a long black line image in horizontal and vertical directions of a binary image by performing rectangle extraction, selecting a table area candidate, and extracting the long black line image in the horizontal and vertical directions as a ruled line.

Furthermore, Japanese Patent No. 3344774 discloses a method of discriminating a separator from an underline by extracting a long black line image in a horizontal direction of a binary image as a ruled line.

In addition, Japanese Patent Application Laid-open No. 2002-133426 discloses a method of extracting a ruled line from a multi-value image, which reduces over-extraction of a ruled line. Specifically, a false ruled line is excluded using an average value of a ratio of gradients of an outline of a ruled line in a tangential direction and a normal direction. Ruled lines extracted by this method can be used for spreadsheet processing or character recognition processing.

Moreover, Japanese Patent Application Laid-open No. 2005-348279 discloses an image forming apparatus applicable to compression of a multi-value image, in which characters and extracted ruled lines are compressed such that the characters and the ruled lines are expressed in monochrome, in which areas corresponding to a background and a picture are compressed at low resolution while maintaining the number of colors, and in which the characters, the ruled lines, and the areas corresponding to the background and the picture are displayed in a superimposed manner. With this method, an image can be compressed while maintaining a level of visibility of the characters and the ruled lines whose outline portion requires a higher level of visibility and a level of visibility of an area of the photographic picture in which the number of colors needs to be maintained. As is indicated by the above examples, the technology for extracting a ruled line is applicable to various fields.

However, when the above conventional technologies are used for compression of a multi-value image, an excessive extraction of the ruled line (over-extraction) may degrade the image quality. Therefore, a process for preventing the over-extraction is required. The methods disclosed in Japanese Patent No. 3215163 and Japanese Patent No. 3344774 are used for a binary image, and do not include a process for preventing the over-extraction that may be caused in a multi-value image.

The method disclosed in Japanese Patent Application No. 2002-133426 includes a process for preventing the over-extraction from a multi-value image. However, when extracting an inclined ruled line, gradients in a tangential direction and a normal direction of a ruled line needs to be obtained, which requires a large number of arithmetic operations. The process is explained briefly with reference to FIG. 9.

FIG. 9 is a schematic diagram for explaining a disadvantage of the conventional method of extracting a ruled line from a multi-value image. As shown in FIG. 9, an outline pixel 46 is a reference point, and a pixel 44 that is "d" pixels away from the outline pixel 46 in a normal direction 43 is used as a pixel necessary for obtaining a gradient θ in the normal direction 43. If a ruled line 40 extends horizontally (without inclination), a pixel that is "d" pixels away from the outline pixel 46 in a vertical direction is used when extracting the ruled line 40. However, when extracting the ruled line 40 that inclines as shown in FIG. 9, an angle θ of a tangential direction 42 to a horizontal direction 45 needs to be obtained, and distances Δx and Δy need to be obtained from Equations (1) and (2):

$$\Delta x = d \sin \theta \quad (1)$$

$$\Delta y = d \cos \theta \quad (2)$$

Then, the pixel value at the coordinates (Δx, Δy), which is a real value (a result of a floating-point arithmetic operation by a computer), is calculated from a pixel value of the original image, which is a discrete value.

FIG. 10 is a schematic diagram for explaining an example in which a false ruled line is extracted when a process for extracting a ruled line is performed on a halftone area. When a multi-value original image is read by a scanner and the read image is partly enlarged as shown in FIG. 10, each pixel is expressed by a pixel value (i.e., brightness). This area originally has no ruled line. However, when the area is binarized with a threshold of 85, continuous pixels in the horizontal direction are extracted as a false ruled line as shown in FIG. 10. If a false ruled line is extracted from a multi-value image (i.e., over-extraction is caused), the image quality is degraded.

SUMMARY OF THE INVENTION

It is an object of the present invention to at least partially solve the problems in the conventional technology.

According to an aspect of the present invention, there is provided an image processing apparatus that includes a binary image generating unit that generates a binary image from a multi-value image; a ruled line candidate extracting unit that extracts ruled line candidate pixels that constitute a ruled line from the binary image; an edge detecting unit that determines from the multi-value image a target pixel that is positioned near a ruled line candidate pixel from among the ruled line candidate pixels and detects edge information indicative of whether the target pixel constitutes an edge, and repeats determination of the target pixel and detection of the edge information for a plurality of pixels from among the ruled line candidate pixels; and a ruled line obtaining unit that obtains a ruled line from the multi-value image based on the edge information detected by the edge detecting unit.

According to another aspect of the present invention, there is provided an image processing method that includes generating a binary image from a multi-value image; extracting ruled line candidate pixels that constitute a ruled line from the binary image; first determining including determining from the multi-value image a target pixel that is positioned near a ruled line candidate pixel from among the ruled line candidate pixels and detecting edge information indicative of whether the target pixel constitutes an edge, and repeating determination of the target pixel and detection of the edge information for a plurality of pixels from among the ruled line candidate pixels; and obtaining a ruled line from the multi-value image based on the edge information detected at the first determining.

According to still another aspect of the present invention, there is provided a computer program product that includes computer program codes stored on a computer readable recording medium that when executed on a computer enables the computer to execute the above method.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIGS. 5A and 5B are schematic diagrams of other examples of spatial filters according to the first embodiment of the present invention;

DETAILED DESCRIPTION OF THE PREFERRED EMBODIMENTS

Exemplary embodiments of the present invention are explained in detail below with reference to the accompanying drawings.

Figure 1:
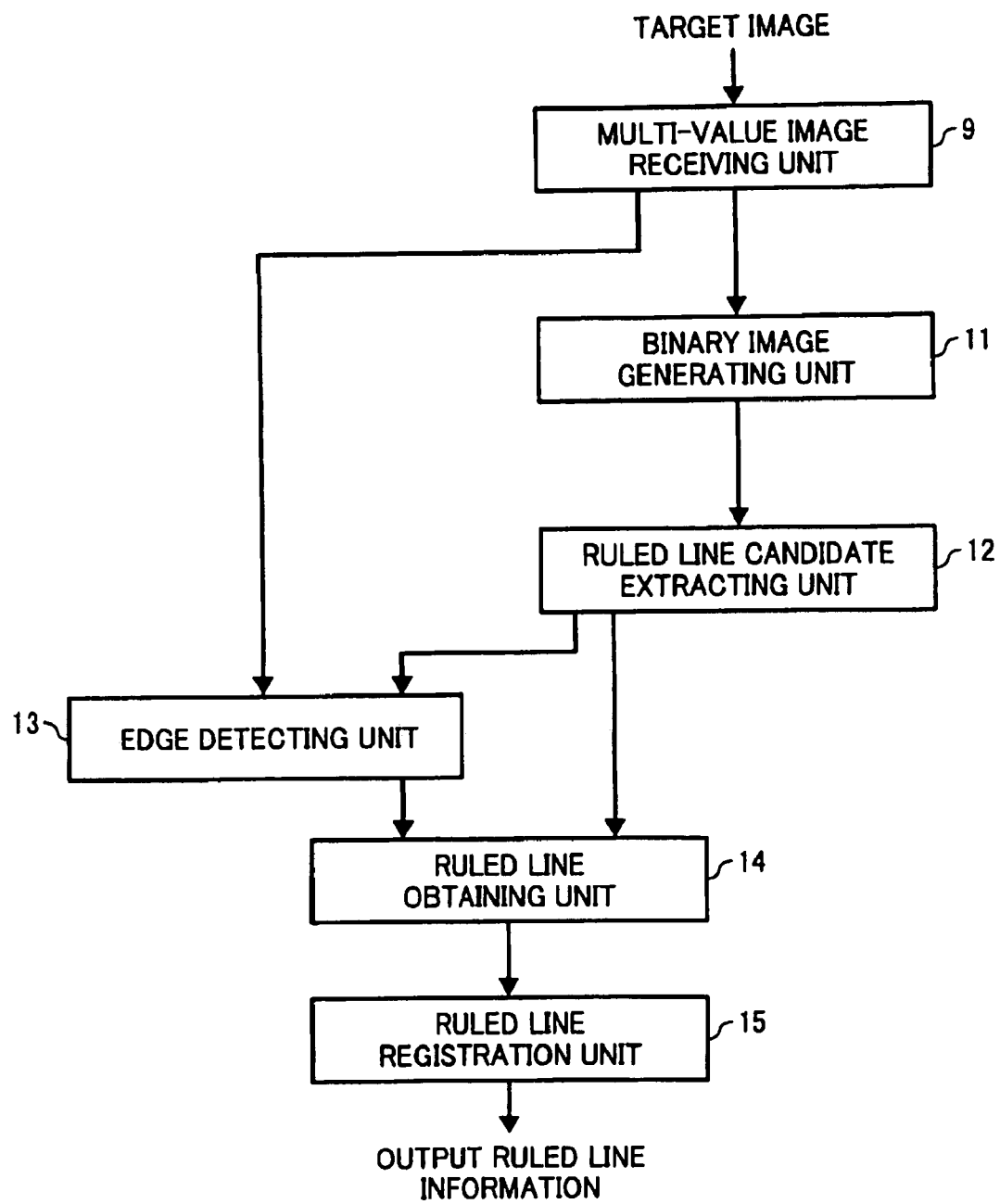
FIG. 1 is a block diagram of an image processing apparatus according to a first embodiment of the present invention.
Figures 2, 3:
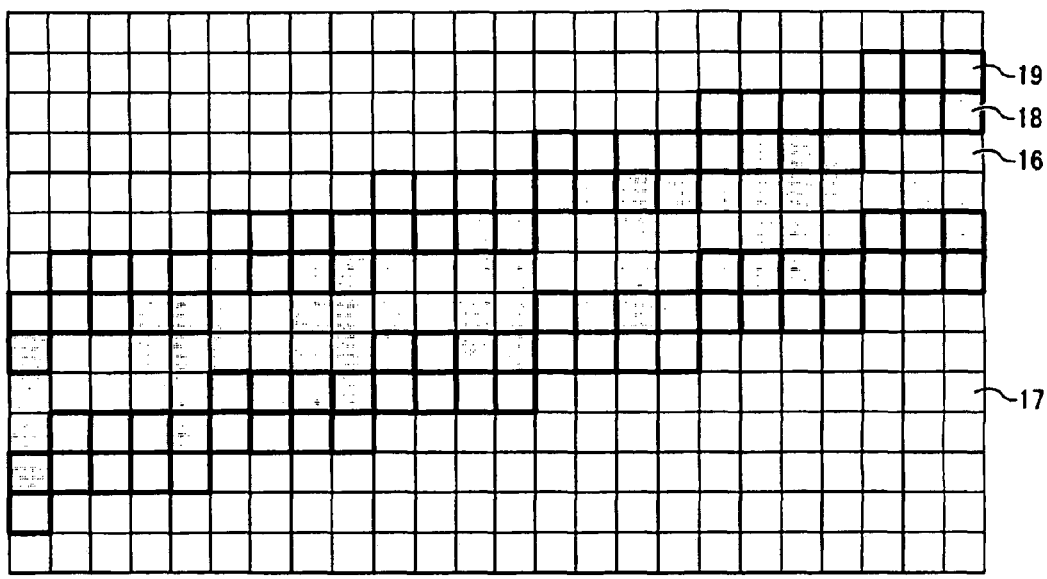
FIG. 2 is a schematic diagram for explaining an edge detection performed on border pixels of a ruled line candidate.
FIG. 3 is a schematic diagram of an example of a spatial filter according to the first embodiment.
Figure 4:
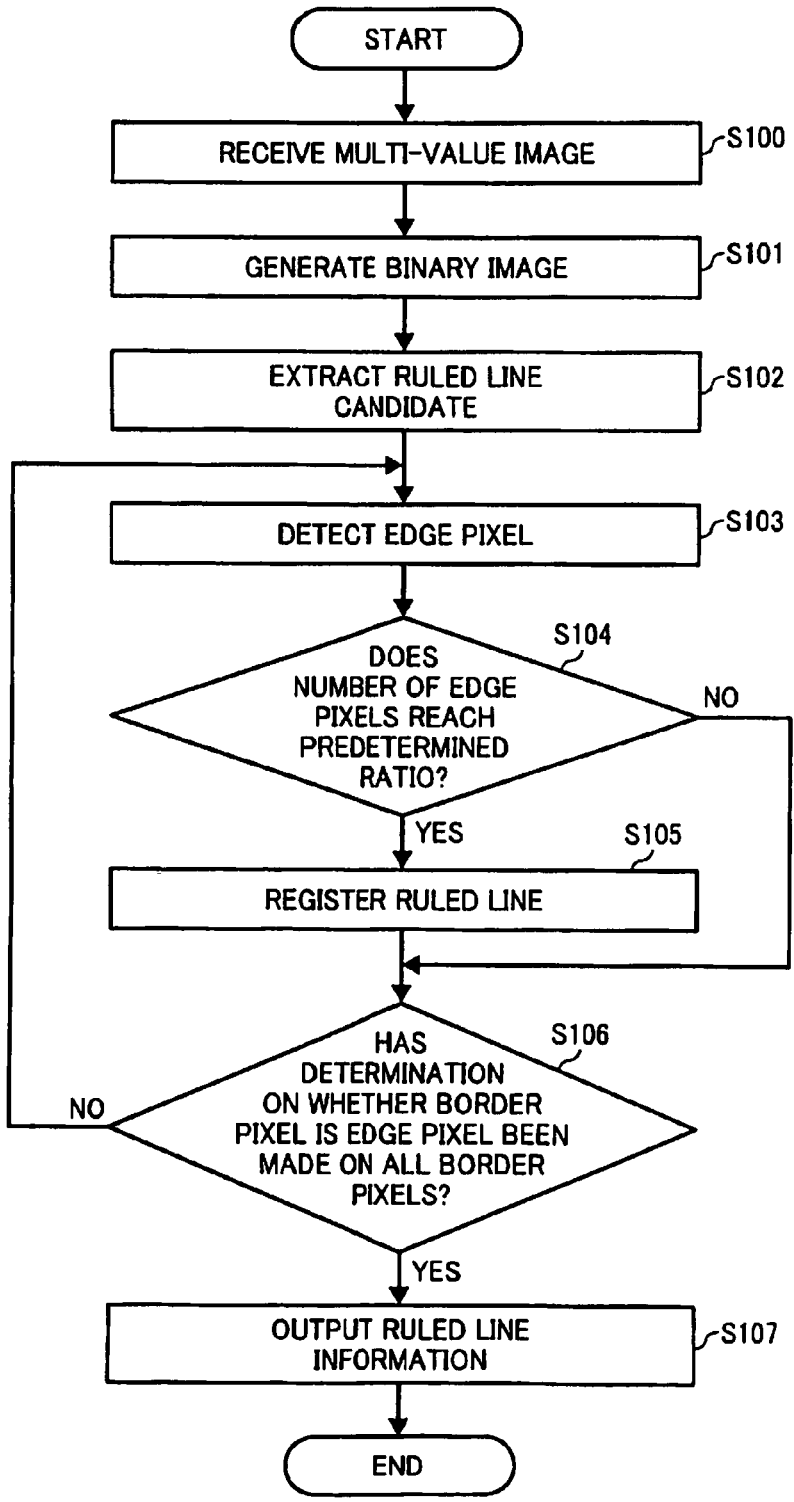
FIG. 4 is a flowchart of operations performed by the image processing apparatus shown in FIG. 1.
Figures 5A, 5B:
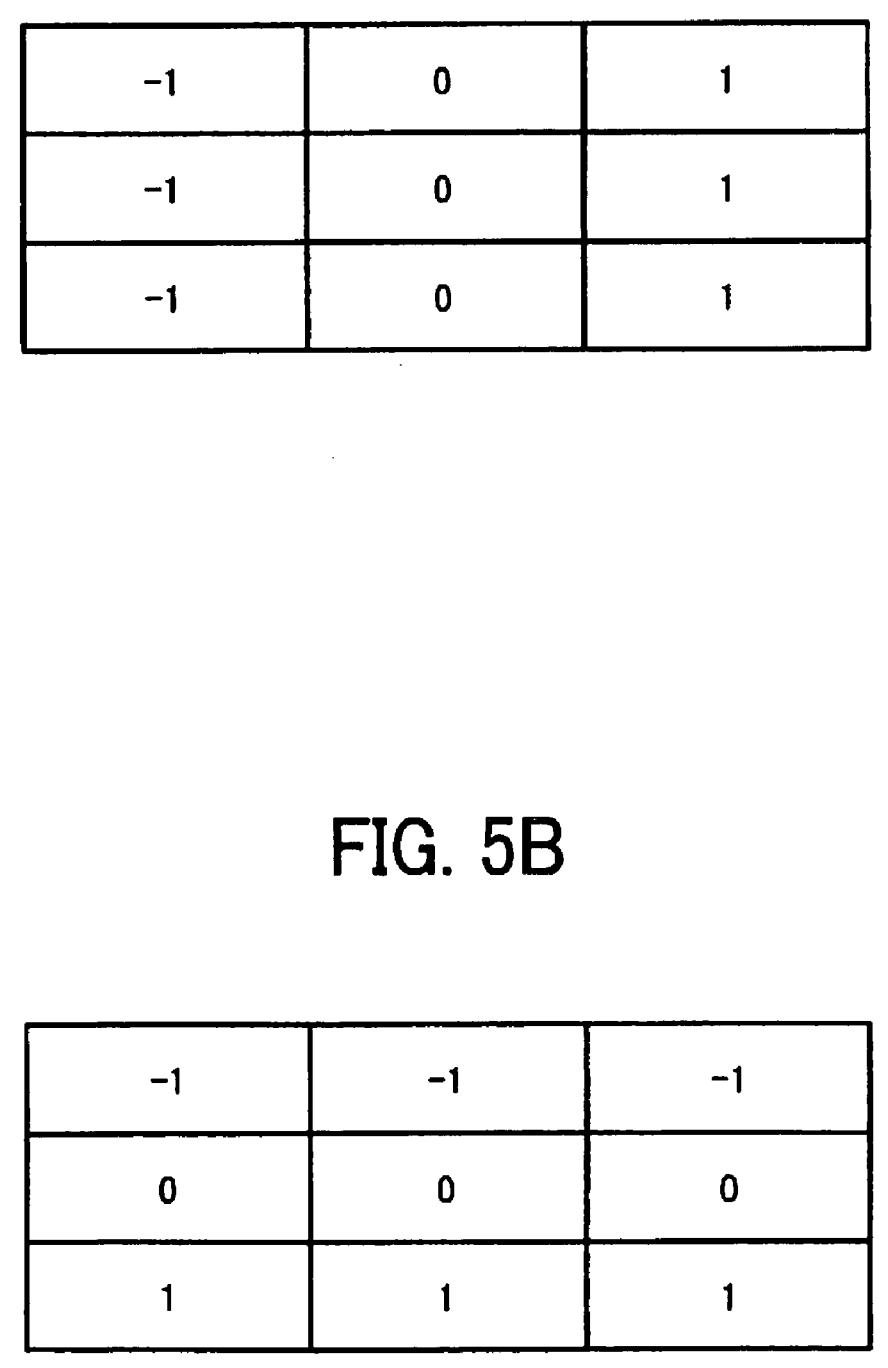

FIG. 1 is a block diagram of an image processing apparatus according to a first embodiment of the present invention. FIG. 2 is a schematic diagram for explaining an edge detection performed on border pixels of a ruled line candidate. FIG. 3 is a schematic diagram of an example of a space filter according to the first embodiment. FIG. 4 is a flowchart of operations performed by the image processing apparatus according to the first embodiment. FIGS. 5A and 5B are schematic diagrams of other examples of spatial filters according to the first embodiment of the present invention.

As shown in FIG. 1, the image processing apparatus according to the first embodiment includes a multi-value image receiving unit 9, a binary image generating unit 11, a ruled line candidate extracting unit 12, an edge detecting unit 13, a ruled line obtaining unit 14, and a ruled line registration unit 15.

The multi-value image receiving unit 9 receives a multi-value image that is a target image from which ruled line candidate pixels that can constitute a ruled line are to be extracted, i.e., a ruled line candidate is to be extracted. A multi-value image is obtained by, for example, reading the target image by a scanner or the like, downloading the multi-value image via a network or the like, or reading the multi-value image from a memory or the like.

Figure 10:
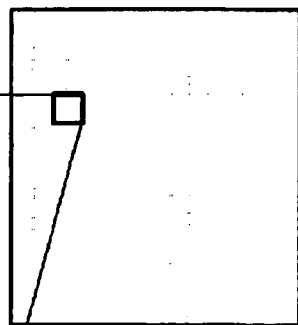
FIG. 10 is a schematic diagram for explaining a case where a false ruled line is extracted from a halftone area.

The binary image generating unit 11 binarizes the multi-value image thereby generating a binary image. For example, as shown in FIG. 10, pixels of the multi-value image are divided into bright pixels as white pixels and dark pixels as black pixels based on brightness information of the multi-value image with a predetermined threshold. When processing a multi-value image that is a color image having red (R), green (G), and blue (B) components, the G component is used as the brightness information and the same processing is performed as explained above.

The ruled line candidate extracting unit 12 extracts ruled line candidate pixels that can constitute a ruled line from the binary image. Some methods can be adopted for extracting the ruled line candidate pixels. For example, a component that consists of black line images (i.e., horizontal or vertical continuous black pixels) and that has a predetermined length or more is extracted. If it is determined that the component is long based on an aspect ratio thereof, the component is extracted as ruled line candidate pixels (see Japanese Patent No. 3344774 and Japanese Patent Application Laid-open No. 2005-348279). In the first embodiment, a different method is employed. Specifically, when a component that consists of black line images and that has a predetermined length or less is extracted, and if it is determined that the component is long based on an aspect ratio thereof, the component is determined as ruled line candidate pixels (see Japanese Patent Application Laid-open No. 2005-348279).

The edge detecting unit 13 obtains information on pixels (hereinafter, "edge pixels") each of which forms an edge near the ruled line candidate pixels, i.e., edge information, from the multi-value image based on the ruled line candidate pixels. A coordinate position of the ruled line candidate pixels of the binary image from the ruled line candidate extracting unit 12 corresponds to that of the pixels of the multi-value image from the multi-value image receiving unit 9. This is because the binary image to be processed by the ruled line candidate extracting unit 12 is obtained by binarizing the multi-value image while the size of the multi-value image is maintained and, on the other hand, the multi-value image to be processed by the edge detecting unit 13 is not changed after received from the multi-value image receiving unit 9. For this reason, the edge information can be obtained by referring to the coordinate position of the multi-value image.

The edge detection by the edge detecting unit 13 is performed on border pixels near the ruled line candidate pixels shown in FIG. 2. The border pixels are pixels at a border between pixels 16 constituting the ruled line candidate and pixels 17 not constituting the ruled line, i.e., border pixels include border pixels 18 constituting the ruled line candidate and border pixels 19 not constituting the ruled line candidate.

The edge detecting unit 13 obtains the edge information on the border pixels near the ruled line candidate pixels extracted from the binary image from the multi-value image and performs spatial filtering on one of the border pixels (hereinafter, "target pixel") and pixels near the target pixel (i.e., spatial filtering is performed on nine pixels) using the spatial filter shown in FIG. 3. If an absolute value of an output obtained from the spatial filtering is larger than a predetermined threshold, the target pixel is determined as an edge pixel that forms an edge. With the spatial filter shown in FIG. 3, brightness of the pixels is calculated such that the brightness of the target pixel is increased and the brightness of pixels adjacent to the target pixel are reduced.

For example, when the multi-value image is a grayscale image, one of the border pixels 18 and 19 that are near the ruled-line candidate pixel is taken as a target pixel, and if "E" obtained from Equation (3) exceeds a predetermined value, where $a_{x,y}$ is brightness of the target pixel and $a_{x-1,y-1}$, $a_{x,y-1}$, $a_{x+1,y-1}$, $a_{x-1,y}$, $a_{x+1,y}$, $a_{x-1,y+1}$, $a_{x,y+1}$, and $a_{x+1,y+1}$ are brightness of pixels adjacent to the target pixel, it is determined that the target pixel forms an edge.

$$E = |8 \times a_{x,y} - a_{x-1,y-1} - a_{x,y-1} - a_{x+1,y-1} - a_{x-1,y} - a_{x+1,y} - a_{x-1,y+1} - a_{x,y+1} - a_{x+1,y+1}| \quad (3)$$

This process is performed on all target pixels constituting the border pixels 18 and 19. Thereafter, the ruled line obtaining unit 14 determines whether the ruled line candidate is a valid ruled line. If the ruled line candidate is a valid ruled line, the ruled line obtaining unit 14 obtains the ruled line.

On the other hand, if the multi-value image is a color image, the arithmetic operation is performed on each of R, G, and B components. In this case, when an absolute value of any one of the R, G, and B components exceeds the predetermined value, the target pixel is determined as an edge pixel. The arithmetic operation is performed on each of the border pixels 18 and 19.

The ruled line obtaining unit 14 determines whether the ruled line candidate is a valid ruled line by utilizing the edge information of the pixels that are determined to constitute an edge by the edge detecting unit 13 based on the border pixels near the ruled line candidate pixels. Specifically, when the number of edge pixels reaches a predetermined ratio to the total number of the border pixels, the ruled line obtaining unit 14 determines that the ruled line candidate is a valid ruled line and obtains the ruled line.

Even if a ruled line that is printed on a back surface of a sheet but seen on a front surface is extracted as ruled line candidate pixels, an edge is hardly detected from border pixels because the extracted ruled line candidate pixels have brightness less different from that of pixels near the extracted ruled line candidate pixels. For this reason, the number of edge pixels does not reach the predetermined ratio to the total number of the border pixels. Accordingly, the ruled line candidate pixels are not determined as a valid ruled line.

The ruled line registration unit 15 registers therein the ruled line that is determined as a valid ruled line based on the ruled line candidate pixels and is obtained by the ruled line obtaining unit 14.

Operations performed by the image processing apparatus according to the first embodiment are explained with reference to FIGS. 1 to 4. The multi-value image receiving unit 9 receives a multi-value image as a target image from which ruled line candidate pixels that can constitute a ruled line are to be extracted (Step S100). The binary image generating unit 11 binarizes the multi-value image with the predetermined threshold, thereby generating a binary value image (Step S101). The ruled line candidate extracting unit 12 extracts the ruled line candidate pixels, i.e., ruled line candidate, from the binary image (Step S102).

The ruled line candidate extracting unit 12 extracts a component that consists of black lines and that has a predetermined run length or less, and determines the component as ruled line candidate pixels when determining that the component is long based on an aspect ratio thereof. However, other methods can be employed.

The edge detecting unit 13 obtains edge information on edge pixels near the ruled line candidate pixels from the multi-value image based on the ruled line candidate pixels extracted from the binary image by the ruled line candidate extracting unit 12. Specifically, the edge detecting unit 13 detects edge information from the border pixels 18 and 19 near the ruled line candidate pixels from the multi-value image at the coordinate position corresponding to that of the binary image. Thereafter, the edge detecting unit 13 performs the spatial filtering on a target pixel out of the border pixels and pixels near the target pixel (i.e., on nine pixels) using the spatial filter shown in FIG. 3. If an absolute value of an output obtained from the spatial filtering is larger than the predetermined threshold, the edge detecting unit 13 determines the target pixel as an edge pixel (Step S103). The operation at Step S103 is performed on each of the border pixels 18 and 19. Because the difference in brightness between the target pixel and those of the pixels near the target pixel is increased with the spatial filter shown in FIG. 3 and determination is made on whether the target pixel forms an edge based on the difference in brightness, the determination can be made without consideration of a ruled line direction.

The ruled line obtaining unit 14 obtains only valid ruled lines from the ruled line candidate pixels based on the edge information. In other words, the ruled line obtaining unit 14 determines whether the ruled line candidate is a valid ruled line based on whether the number of edge pixels reaches the predetermined ratio with respect to the total number of the border pixels (Step S104).

When the ruled line obtaining unit 14 determines the ruled line candidate as a valid ruled line and obtains it (YES at Step S104), the ruled line registration unit 15 registers therein the ruled line as ruled line information (Step S105). When the ruled line candidate is a false ruled line (NO at Step S104), no ruled line is registered in the ruled line registration unit 15 and the process control goes to Step S106.

When the edge detection has not been performed on all of the border pixels 18 and 19 and the determination has not been made on whether the ruled line candidate is a valid ruled line based on a detected edge at Step S106 (NO at Step S106), the process control goes back to Step S103 and the same processing from Step S103 to Step S105 is repeated.

When the edge detection has been performed on all of the border pixels 18 and 19 and the determination has been made (YES at Step S106), the ruled line information registered in the ruled line registration unit 15 is output (Step S107).

The edge detection can be performed using a plurality of spatial filters shown in FIGS. 5A and 5B instead of the spatial filter shown in FIG. 3. With the spatial filter shown in FIG. 5A, brightness of the pixels is calculated such that the difference in brightness between the pixels is increased in a horizontal direction. With the spatial filter shown in FIG. 5B, brightness of the pixels can be calculated such that the difference in brightness between the pixels is increased in a vertical direction.

Specifically, the edge detecting unit 13 performs the spatial filtering on a target pixel and pixels near the target pixel (i.e., on nine pixels) using each of the spatial filters shown in FIGS. 5A and 5B. When a sum of squares of outputs obtained from the spatial filtering is larger than a predetermined threshold, the target pixels is determined as an edge pixel. With the spatial filters shown in FIGS. 5A and 5B, the difference in brightness between the pixels in the vertical direction is different from that in the horizontal direction. Therefore, even when processing an original image to which a piece of dirt is attached, or that contains a hatching area, detection of a false ruled line can be reduced. For example, although it depends on a resolution of an image, in a case where an original image in which a dot of the hatching area corresponds to 1×1 pixel is processed, detection of the dot as an edge pixel is reduced with the spatial filters shown in FIGS. 5A and 5B compared to the method using the spatial filter shown in FIG. 3. Therefore, a false ruled line that may be extracted as a ruled line candidate in, for example, a hatching area or the like can be excluded.

Figure 6:
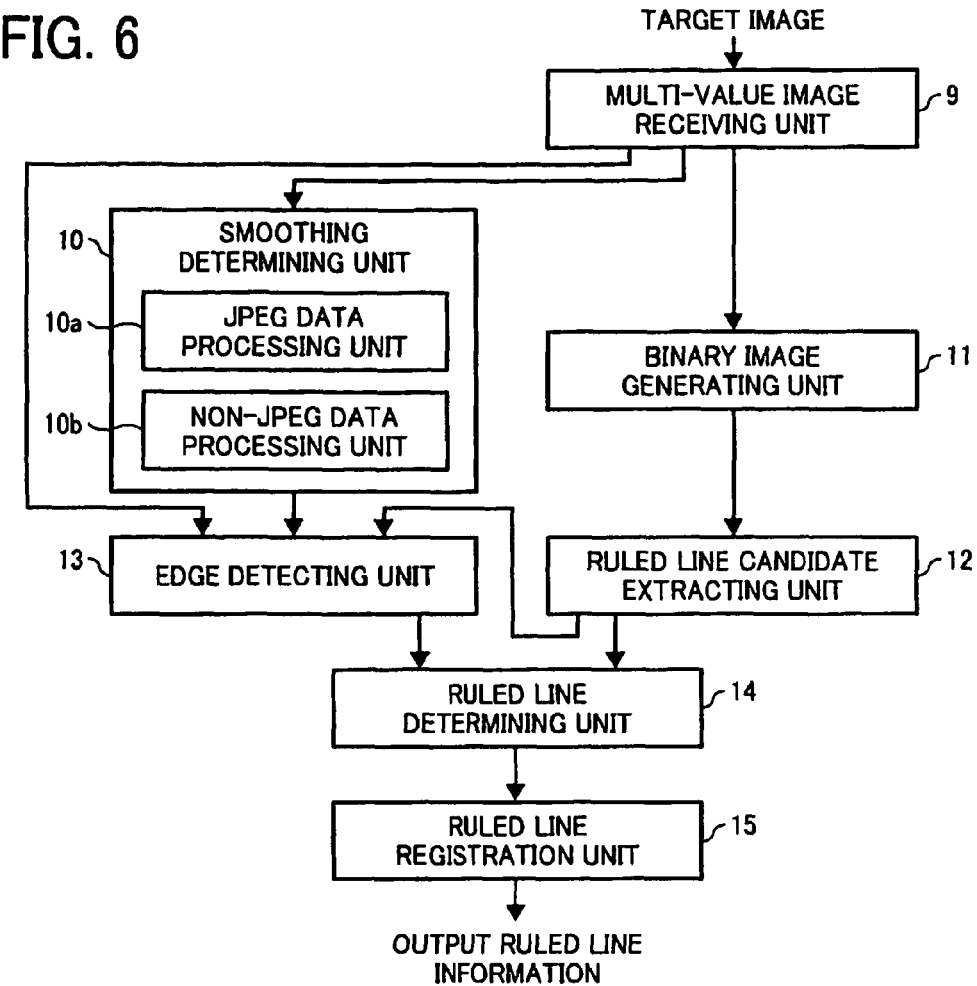
FIG. 6 is a block diagram of an image processing apparatus according to a second embodiment of the present invention.

As explained above, the multi-value image (i.e., the target image) is binarized thereby obtaining the binary image. The ruled line candidate pixels that can constitute a ruled line are obtained from the binary image, and the edge information on pixels that constitute an edge and are positioned near the ruled line candidate pixels is obtained based on the ruled line candidate pixels from the coordinate position of the pixels of the multi-value image, which corresponds to that of the binary image. Thereafter, the spatial filtering is performed on the target pixel out of the border pixels of the ruled line candidate and the pixels near the target pixel. When the absolute value of the output obtained from the spatial filtering is larger than the predetermined threshold, the target pixel is determined as an edge pixel. When the number of edge pixels reaches the predetermined ratio to the total number of the border pixels, the ruled line candidate is determined as a valid ruled line. When the number of the edge pixels does not reach the predetermined ratio to the total number of the border pixels, the ruled line candidate is determined as a false ruled line. Therefore, with a small number of arithmetic operations, false ruled lines can be excluded and over-extraction can be reduced, i.e., only valid ruled lines can be efficiently extracted. Particularly, in the method disclosed in Japanese Patent Application Laid-open No. 2005-133426, when a ruled line is inclined, processing for determining a reference pixel is needed to obtain a gradient of the ruled line in a tangential direction and a normal direction, which is unnecessary in the first embodiment. Thus, the rule line can be extracted with a small number of arithmetic operations FIG. 6 is a block diagram of an image processing apparatus according to a second embodiment of the present invention. As shown in FIG. 6, an image processing apparatus according to the second embodiment basically has the same configuration as that of the first embodiment except that it includes a smoothing determining unit 10 that includes a JPEG data processing unit 10a and a non-JPEG data processing unit 10b.

A multi-value image is received as a target image from, for example, a scanner. Depending on scanners, smoothing processing is performed on the multi-value image to prevent moire. Therefore, if the edge detection of the first embodiment is performed on such a smoothed multi-value image, the accuracy in the edge detection may be reduced. The smoothed multi-value image has a lower ratio of high-frequency components. Therefore, if the edge detection is performed on the smoothed multi-value image with the predetermined threshold, an edge pixel that should be detected cannot be detected, which leads to inaccurate determination on whether a ruled line candidate is a valid ruled line. For this reason, the image processing apparatus according to the second embodiment changes the image processing depending on whether the smoothing processing has been performed on a multi-value image to accurately determining a valid ruled line.

When a compressed multi-value image is obtained by converting a spatial domain to a frequency domain, it contains frequency information. The smoothing determining unit 10 calculates a ratio of high frequency components based on a frequency distribution of the frequency information. The smoothing determining unit 10 determines whether the multi-value image contains frequency information by determining whether the multi-value image is JPEG data based on a data format of the multi-value image. If the multi-value image is JPEG data obtained by performing Fourier transformation, it contains information on pixel position and frequency information, i.e., frequency distribution. The JPEG data processing unit 10a calculates a ratio of high frequency components from the frequency distribution. When the ratio of the high frequency components is lower than a predetermined ratio, the JPEG data processing unit 10a determines that the smoothing processing has been performed on the multi-value image and changes the predetermined threshold to be used for the edge detection by the edge detecting unit 13 (hereinafter, "predetermined edge detection threshold") to increases the accuracy of the edge detection. On the other hand, when the ratio of the high frequency components is the predetermined ratio or higher, the JPEG data processing unit 10a determines that the smoothing process has not been performed on the multi-value image and the predetermined edge detection threshold is maintained.

If the multi-value image is a compressed image obtained not by converting the spatial domain to the frequency domain, the multi-value image is not JPEG data and does not contain frequency information, therefore unable to view frequency distribution. Therefore, the non-JPEG data processing unit 10b performs Fourier transformation on the multi-value image to obtain frequency distribution. Thereafter, the smoothing determining unit 10 calculates a ratio of high frequency components from the frequency distribution. When the ratio of the high frequency components is lower than a predetermined ratio, it is determined that the smoothing processing has been performed on the multi-value image. In this case, the predetermined edge detection threshold is changed to increase the accuracy of the edge detection. On the other hand, when the ratio of the high frequency components is the predetermined ratio or higher, the smoothing process has not been performed on the multi-value image. Therefore, the predetermined edge detection threshold is maintained.

As explained above, the smoothing determining unit 10 determines whether the smoothing processing has been performed on the multi-value from the ratio of the high frequency components based on the frequency distribution of the multi-value image. When the smoothing processing has been performed on the multi-value image, predetermined edge detection threshold is changed to increase the accuracy of the edge detection. On the other hand, when the smoothing processing has not been performed on the multi-value image, the predetermined edge detection threshold is maintained. Therefore, accurate extraction of a ruled line can be performed not depending on whether the smoothing processing is performed on the multi-value image.

Figure 7:
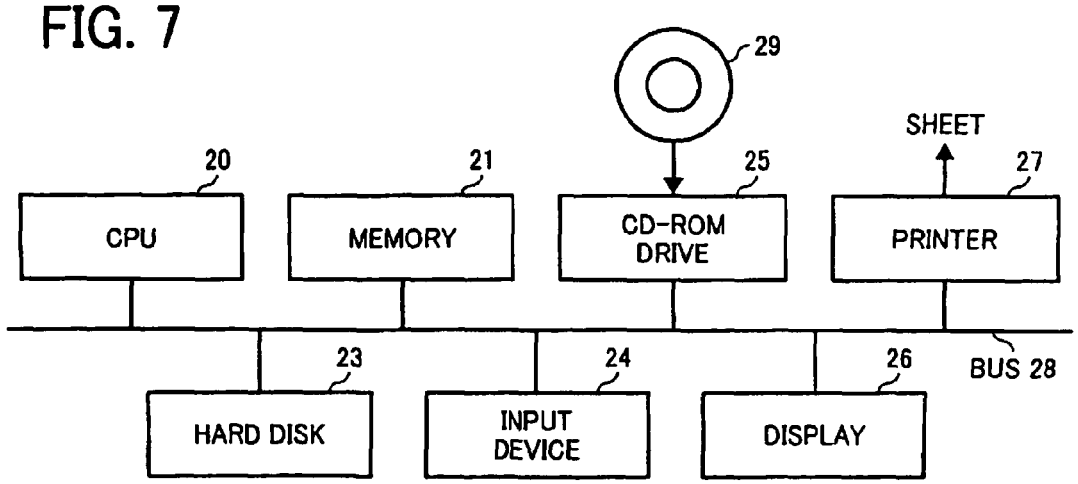
FIG. 7 is a schematic diagram of the image processing apparatuses according to the first and second embodiments.

FIG. 7 is a schematic diagram of the image processing apparatus according to the present invention. The functions of the units constituting the image processing apparatus can be programmed as a computer-executable program, and the computer program can be stored in a computer-readable recording medium and executed on a computer. Alternatively, a part of the image processing apparatus can be included in a network, and the image processing can be realized via a communication channel.

In other words, the image processing apparatuses according to the first and second embodiments can be realized by executing a pre-installed computer program on a computer (i.e., a CPU 20 shown in FIG. 7) such as a personal computer (PC) or a work station. The computer program is stored in a memory 21, a hard disk 23, or a computer-readable recording medium 29 such as a compact disc read only memory (CD-ROM), a magneto optical (MO) disk, or a digital versatile disc (DVD) by operating an input device 24 such as a keyboard. The computer program can be read from the recording medium 29 via a CD-ROM drive 25 and executed while being displaying on a display 26 and printed out from a printer 27 if necessary. Data can be communicated between the image processing apparatus and an external device via a communication device (not shown) according to need.

The computer program can be distributed via the recording medium 29 to a device such as a personal computer connected to a network such as the Internet.

In other words, the computer program can be pre-installed in, for example, the hard disk 23 that is a recording medium incorporated in the computer. The computer program can be provided as packaged software by storing the computer program in a recording medium temporarily or permanently and using the recording medium as a unit incorporated in the computer or as a removable recording medium.

For example, a flexible disk, a CD-ROM, an MO disk, a DVD, a magnetic disk, or a semiconductor memory can be used as the recording medium 29.

The computer program can be downloaded to the computer from a download site via a network such as a local area network (LAN) or the Internet by wireless communication or wired communication, and can be stored in a storage device such as a hard disk incorporated in the computer.

A multi-value image to be processed is stored in, for example, the hard disk 23 via the input device 24 such as a scanner. The CPU 20 reads the computer program from the recording medium 29 and executes the computer program. The results of image processing are stored in the hard disk 23. The results can be displayed on the display 26 and printed on a recording medium such as a sheet by the printer 27.

Figure 8:
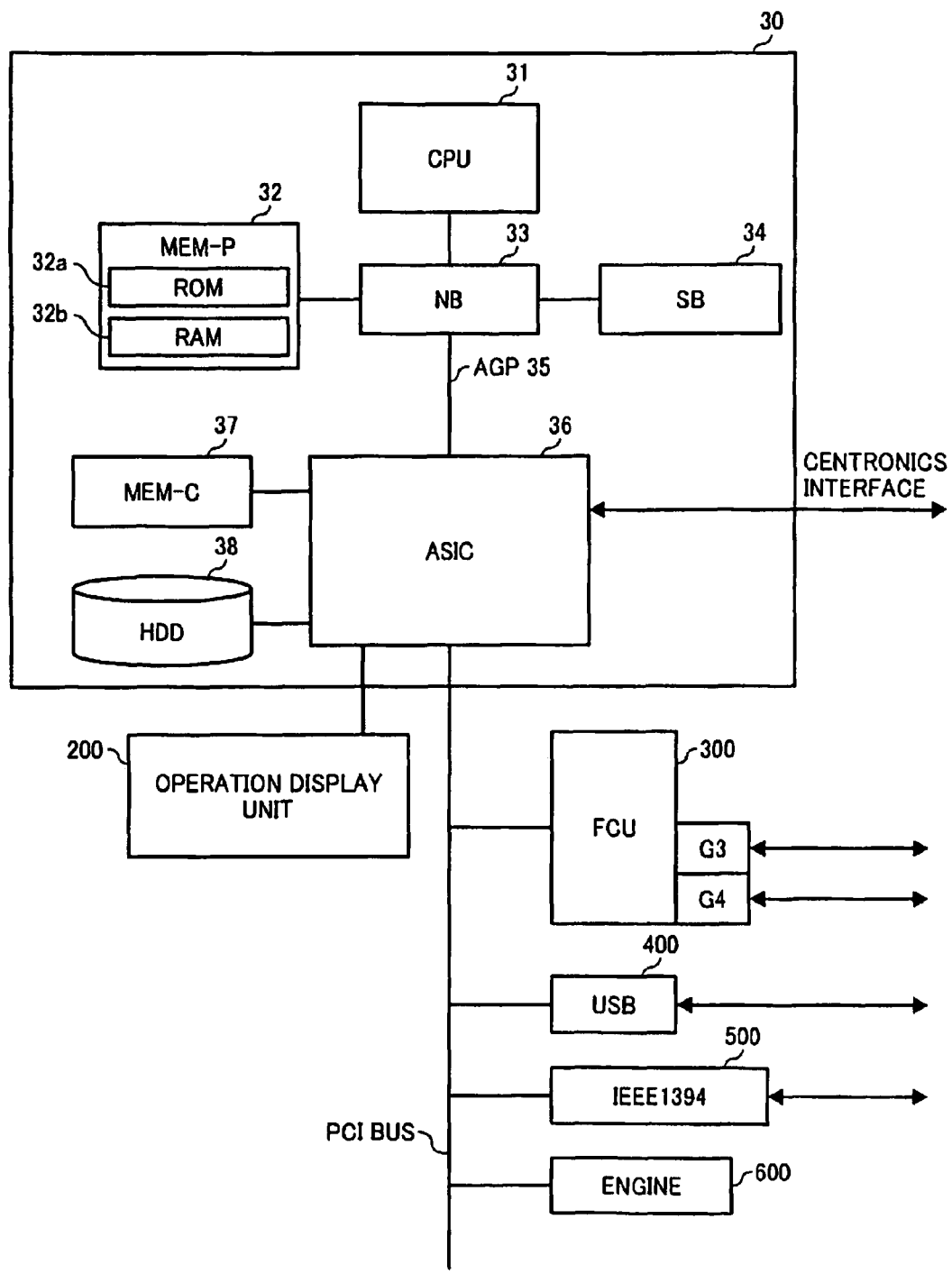
FIG. 8 is a block diagram of a multifunction peripheral (MFP) to which the image processing apparatus according to the embodiments is applied.
Figure 9:
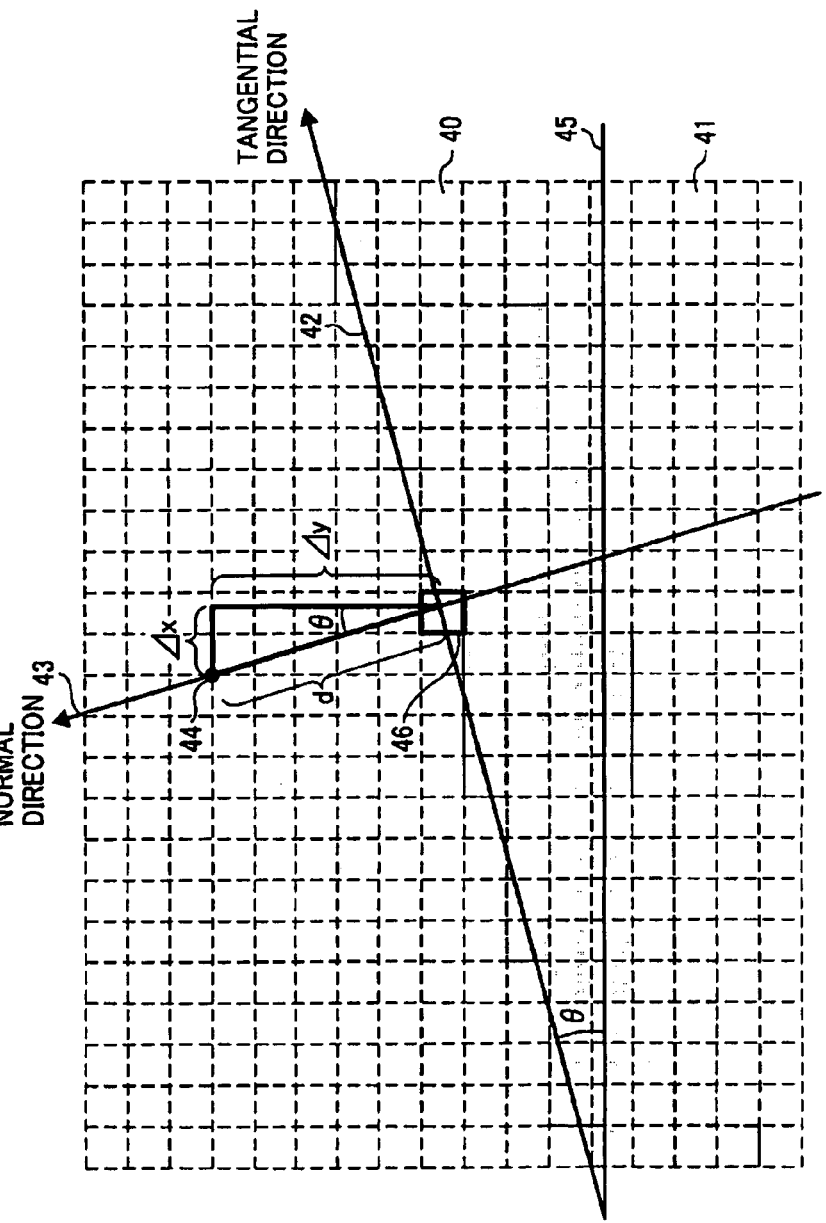
FIG. 9 is a schematic diagram for explaining a disadvantage of a conventional method of extracting a ruled line from a multi-value image.

As explained above, the image processing apparatuses according to the first and second embodiments is applied to an information processing apparatus such as a PC. Alternatively, the image processing apparatuses can be applied to a multi-function peripheral (MFP) having functions of a printer, a copier, a scanner, a facsimile machine, etc. FIG. 8 is a block diagram of the MFP to which the image processing apparatus according to the embodiments is applied. The MFP includes a controller 30 and an engine 600 that are connected with each other via a peripheral component interconnect (PCI) bus. The controller 30 controls the MFP, drawing, communication, and input from an operation unit (not shown). The engine 600 is a printer engine that is connectable to the PCI bus, and examples of which include a black and white plotter, a single drum color plotter, a four drum color plotter, a scanner, and a facsimile unit. The engine 600 further includes an image processing unit that performs, for example, error dispersion and gamma conversion.

The controller 30 includes a CPU 31, a north bridge (NB) 33, a system memory (MEM-P) 32, a south bridge (SB) 34, a local memory (MEM-C) 37, an application specific integrated circuit (ASIC) 36, and a hard disk drive (HDD) 38. The NB 33 and the ASIC 36 are connected to each other via an accelerated graphics port (AGP) 35. The MEM-P 32 includes a read only memory (ROM) 32a and a random access memory (RAM) 32b.

The CPU 31 controls the MFP. The CPU 31 includes a chip set including the NB 33, the MEM-P 32, and the SB 34, and is connected to other devices via the chip set.

The NB 33 that connects the CPU 31 to the MEM-P 32, the SB 34, and the AGP 35. The NB 33 includes a memory controller that controls writing of data to the MEM-P 32 and reading data from the MEM-P 32, a PCI master, and an AGP target.

The MEM-P 32 is a system memory used for a memory for storing a computer program and data, a memory for developing a computer program and data, a memory for writing by a printer, or the like. The ROM 32a stores therein a computer program or data. The RAM 32b is a readable/writable memory used for, for example, developing a computer program and data or drawing by a printer.

The SB 34 connects the NB 33 to the PCI device (not shown) and a peripheral device. The SB 34 is connected to the NB 33 via the PCI bus to which a network interface (I/F) is connected.

The ASIC 36 includes a hardware component for image processing and connects the AGP 35, the PCI bus, the HDD 38, and the MEM-C 37 to each another. The ASIC 36 includes a PCI target, an AGP master, an arbiter (ARB) that has a main function of the ASIC 36, a memory controller that controls the MEM-C 37, a plurality of direct memory access controllers that, for example, rotate image data based on a hardware logic, and a PCI unit that communicates data with the engine 600 via the PCI bus. A facsimile control unit (FCU) 300, a universal serial bus 400, and an IEEE 1394 interface 500 are connected to the ASIC 36 via the PCI bus. An operation display unit 200 is directly connected to the ASIC 36.

The MEM-C 37 is a local memory used as a buffer memory for coding or storing an image to be copied. The HDD 38 stores therein image data, computer programs, font data, and format data.

The AGP 35 is a bus interface for a graphics accelerator card to speed up graphic processing. By directly accessing the MEM-P 32 with high throughput, the graphics accelerator card can achieve high speed processing.

The image processing apparatuses, the image processing method, and the computer program are effectively used to extract a ruled line from a multi-value image without over-extraction and particularly suitable for an image processing apparatus, the image processing method, and a computer program that are applicable to compression technologies using a mixed raster content (MRC) technology such as a high compressed portable document format (PDF).

According to an aspect of the present invention, a ruled line can be extracted from a binary image without complicated computation while reducing over-extraction by excluding a false ruled line, thereby efficiently extracting a ruled line.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising:
a binary image generating unit configured to generate a binary image from a multi-value image;
a ruled line candidate extracting unit configured to extract ruled line candidate pixels that constitute a ruled line from the binary image;
an edge detecting unit configured to determine, from the multi-value image, a target pixel that is positioned near a ruled line candidate pixel from among the ruled line candidate pixels, detect edge information indicative of whether the target pixel constitutes an edge, and repeat determination of the target pixel and detection of the edge information for a plurality of pixels from among the ruled line candidate pixels; and
a ruled line obtaining unit configured to obtain a ruled line from the multi-value image based on the edge information detected by the edge detecting unit, wherein the edge detecting unit is configured to perform spatial filtering on an area that includes the target pixel and pixels around the target pixel, and when an output obtained from the spatial filtering is larger than a threshold, the edge detecting unit is configured to detect information on the target pixel as the edge information.

2. The image processing apparatus according to claim 1, wherein the multi-value image is a color image, and the edge detecting unit is configured to detect the edge information for each of a plurality of color components in the color image.

3. The image processing apparatus according to claim 1, wherein the ruled line obtaining unit configured to obtain, as the ruled line, an area in which number of pixels that are determined to constitute the edge is larger than a predetermined ratio by using the edge information.

4. The image processing apparatus according to claim 1, further comprising a smoothing determining unit configured to determine whether smoothing processing has been performed on the multi-value image, wherein when the smoothing processing has been performed on the multi-value image, the edge detecting unit is configured to change the threshold and detect the edge information with a changed threshold.

5. The image processing apparatus according to claim 4, wherein the multi-value image is a compressed image obtained by converting a spatial domain to a frequency domain, and when the multi-value image includes high frequency components above a frequency in a ratio less than a ratio, the smoothing determining unit is configured to determine that the smoothing processing has been performed on the multi-value image.

6. The image processing apparatus according to claim 4, wherein the multi-value image is a compressed image obtained without converting a spatial domain to a frequency domain, and the smoothing determining unit is configured to perform Fourier transformation on pixels of the multi-value image to obtain a frequency distribution, and determine whether the smoothing processing has been performed on the multi-value image based on the frequency distribution.

7. A computer program product that includes computer program codes stored on a non-transitory computer readable recording medium that when executed on a computer enables the computer to execute:
generating a binary image from a multi-value image;
extracting ruled line candidate pixels that constitute a ruled line from the binary image;
first determining including determining, from the multi-value image, a target pixel that is positioned near a ruled line candidate pixel from among the ruled line candidate pixels, detecting edge information indicative of whether the target pixel constitutes an edge, and repeating determination of the target pixel and detection of the edge information for a plurality of pixels from among the ruled line candidate pixels; and
obtaining a ruled line from the multi-value image based on the edge information detected at the first determining, wherein the first determining includes performing spatial filtering on an area that includes the target pixel and pixels around the target pixel, and when an output obtained from the spatial filtering is larger than a threshold, the first determining includes detecting information on the target pixel as the edge information.

8. The computer program product according to claim 7, wherein the multi-value image is a color image, and the first determining includes detecting the edge information for each of a plurality of color components in the color image.

9. The computer program product according to claim 7, wherein the obtaining includes obtaining, as the ruled line, an area in which number of pixels that are determined to constitute the edge is larger than a ratio by using the edge information.

10. The computer program product according to claim 7, wherein the computer program codes enables the computer to further execute:
second determining including determining whether smoothing processing has been performed on the multi-value image; and
changing, when the smoothing processing has been performed on the multi-value image, the threshold and performing the first determining with a changed threshold.

11. The computer program product according to claim 10, wherein the multi-value image is a compressed image obtained by converting a spatial domain to a frequency domain, and when the multi-value image includes high frequency components above a frequency in a ratio less than a ratio, the second determining includes determining that the smoothing processing has been performed on the multi-value image.

12. The computer program product according to claim 10, wherein the multi-value image is a compressed image obtained without converting a spatial domain to a frequency domain, and the second determining includes performing Fourier transformation on pixels of the multi-value image to obtain a frequency distribution, and determining whether the smoothing processing has been performed on the multi-value image based on the frequency distribution.

13. An image processing method comprising:
generating a binary image from a multi-value image;
extracting ruled line candidate pixels that constitute a ruled line from the binary image;
first determining including determining from the multi-value image a target pixel that is positioned near a ruled line candidate pixel from among the ruled line candidate detecting edge information indicative of whether the target pixel constitutes an edge, and repeating determination of the target pixel and detection of the edge information for a plurality of pixels from among the ruled line candidate pixels; and
obtaining a ruled line from the multi-value image based on the edge information detected at the first determining, wherein the first determining includes performing spatial filtering on an area that includes the target pixel and pixels around the target pixel, and when an output obtained from the spatial filtering is larger than a threshold, the first determining includes detecting information on the target pixel as the edge information.

14. The image processing method according to claim 13, wherein the multi-value image is a color image, and the first determining includes detecting the edge information for each of a plurality of color components in the color image.

15. The image processing method according to claim 13, wherein the obtaining includes obtaining, as the ruled line, an area in which number of pixels that are determined to constitute the edge is larger than a ratio by using the edge information.

16. The image processing method according to claim 13, further comprising:
   second determining including determining whether smoothing processing has been performed on the multi-value image; and
   changing, when the smoothing processing has been performed on the multi-value image, the threshold and performing the first determining with a changed threshold.

17. The image processing method according to claim 16, wherein the multi-value image is a compressed image obtained by converting a spatial domain to a frequency domain, and when the multi-value image includes high frequency components above a frequency in a ratio less than a ratio, the second determining includes determining that the smoothing processing has been performed on the multi-value image.

* * * * *